US007436375B2

(12) United States Patent
Hirakawa et al.

(10) Patent No.: US 7,436,375 B2
(45) Date of Patent: Oct. 14, 2008

(54) METHOD FOR DRIVING PLASMA DISPLAY PANEL

(75) Inventors: Hitoshi Hirakawa, Kawasaki (JP); Manabu Ishimoto, Kawasaki (JP); Kenji Awamoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 493 days.

(21) Appl. No.: 10/999,060

(22) Filed: Nov. 30, 2004

(65) Prior Publication Data

US 2006/0022967 A1 Feb. 2, 2006

(30) Foreign Application Priority Data

Jul. 30, 2004 (JP) ............................. 2004-223368

(51) Int. Cl.
*G09G 3/28* (2006.01)
*G09G 5/00* (2006.01)
*G06F 3/038* (2006.01)

(52) U.S. Cl. ........................................ 345/60; 345/208

(58) Field of Classification Search ................... 345/60, 345/67, 204, 208, 210; 315/169.1, 169.4
See application file for complete search history.

(56) References Cited

U.S. PATENT DOCUMENTS 6,160,529 A * 12/2000 Asao et al. .................... 345/60
6,249,087 B1 6/2001 Takayama et al.
6,512,501 B1 * 1/2003 Nagaoka et al. ............... 345/66
7,286,102 B2 10/2007 Yoon et al.
2002/0135545 A1 * 9/2002 Akiba .......................... 345/60
2003/0034937 A1 * 2/2003 Kim ............................ 345/63
2004/0164931 A1 * 8/2004 Han et al. ..................... 345/60
2005/0140585 A1 * 6/2005 Seo et al. ...................... 345/60

FOREIGN PATENT DOCUMENTS

JP 9-22271 1/1997
JP 2001-013911 1/2001
JP 2001-13911 1/2001
KR 2003-0092783 12/2003

OTHER PUBLICATIONS

Official Communication issued in Korean Counterpart Application 10-2004-0100578 dated Apr. 28, 2006.

* cited by examiner

*Primary Examiner*—Amr Awad
*Assistant Examiner*—Stephen G Sherman
(74) *Attorney, Agent, or Firm*—Staas & Halsey LLP

(57) ABSTRACT

An address pulse width is reduced, so that a display period for driving a plasma display panel (PDP) can be made longer. The PDP comprises cells, each cell having parallel first and second electrodes covered with dielectric and a third electrode disposed in a direction crossing the first and second electrodes. A method of driving the PDP comprises addressing ones of the cells to be illuminated for displaying. The addressing comprises effecting an operation of producing wall charges having the same polarity on the dielectric layers over the first and second electrodes before an operation of producing discharge between the second and third electrodes for addressing, so that the discharge for addressing occurs only between the second and third electrodes.

4 Claims, 9 Drawing Sheets

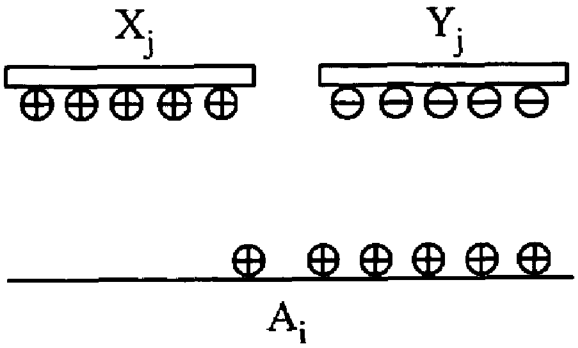
FIG. 4A AFTER RESETTING DISCHARGE
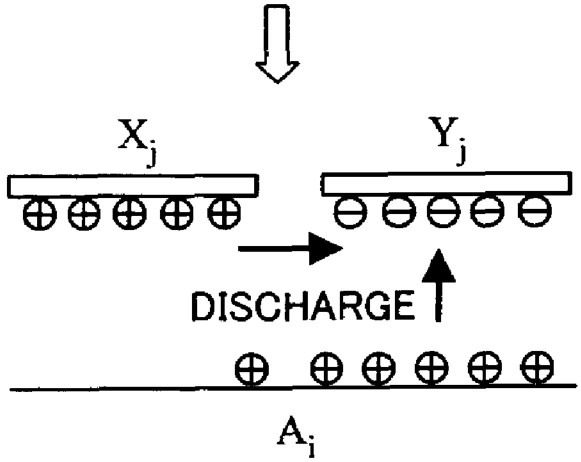
FIG. 4B ADDRESSING DISCHARGE
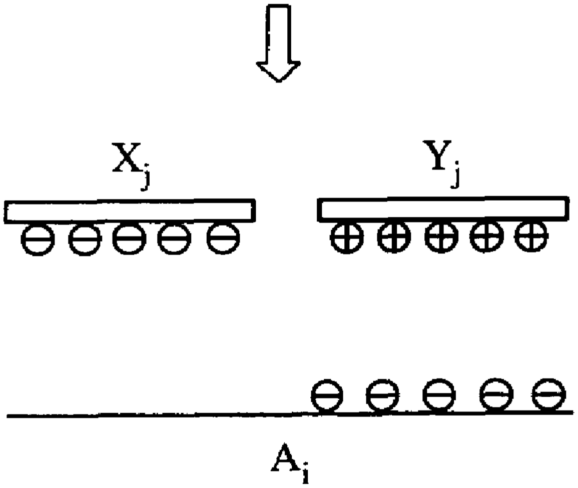
FIG. 4C AFTER ADDRESSING DISCHARGE

AFTER SUSTAIN PERIOD

PRE-RESETTING

AFTER RESETTING DISCHARGE

ADDRESSING DISCHARGE

AFTER ADDRESSING DISCHARGE

POST-ADDRESSING

METHOD FOR DRIVING PLASMA DISPLAY PANEL

FIELD OF THE INVENTION

The present invention relates generally to driving of a plasma display panel (PDP), and more particularly to application of resetting voltage in the PDP.

BACKGROUND ART

As described in Japanese Unexamined Publication JP 2001-13911 (A) (which corresponds to U.S. Pat. No. 6,249,087 B2), during the address period of time, a PDP selectively produces vertical opposite discharge, as a trigger, between a plurality of addressing electrodes A's and a plurality of scanning electrodes Y's that cross each other at right angles, and then it produces surface discharge between the scanning electrodes Y's and sustaining electrodes X's through surface discharge, to thereby determine selected cells to produce discharge for displaying and unselected cells to produce no discharge. Thus, the addressing discharge during the address period is a series of discharging occurrences consisting of the vertical opposite discharging occurrences between the addressing electrodes A's and the scanning electrodes Y's, and surface discharging occurrences between the scanning electrodes Y's and the sustaining electrodes X's. This addressing discharge requires high accuracy. For example, when no addressing discharge occurs in a particular cell to be caused to emit light, this cell does not emit light undesirably. When addressing discharge occurs in another particular cell to be inhibited from emitting light, this cell emits light undesirably. For the addressing discharge, even when the discharge occurs between the addressing electrode A and the scanning electrode Y, the addressing discharge may result in a failure if no discharge occurs between the scanning electrode Y and the sustaining electrode X. Thus, the quality of display is degraded when the accuracy of addressing discharge is insufficient. Thus the addressing voltage is conventionally raised or the address pulse width is expanded in order to improve the accuracy of the addressing discharge.

SUMMARY OF THE INVENTION

In accordance with an aspect of the present invention, a plasma display panel includes cells, each cell having parallel first and second electrodes covered with dielectric and a third electrode disposed in a direction crossing the first and second electrodes, and a method of driving the plasma display panel comprises addressing ones of the cells to be illuminated for displaying. The addressing ones of the cells comprising effecting an operation of producing wall charges having the same polarity on the dielectric layers over the first and second electrodes before an operation of producing discharge between the second and third electrodes for addressing, so that the discharge for addressing occurs only between the second and third electrodes.

In accordance with another aspect of the invention, a method of driving the plasma display panel comprises defining a reset period for adjusting a plurality of wall charges, an address period for illuminating ones of the cells in accordance with display data, and a sustain period for sustaining the illumination of the illuminated cells. The method further comprises producing wall charges having the same polarity on the dielectric layers over the first and second electrodes of all of the cells, during the reset period; and producing discharge only between the second and third electrodes of the illuminated cells, during the address period.

BRIEF DESCRIPTION OF THE DRAWINGS

FIGS. 4A, 4B and 4C show different states of the wall charges induced over the addressing electrode $A_i$, the sustaining electrode $X_j$ and the scanning electrode $Y_j$ of a cell, that appear right after the reset discharge, during the subsequent addressing discharge, and right after the addressing discharge, respectively, in accordance with the conventional driving sequence shown in FIG. 3;

DESCRIPTION OF THE PREFERRED EMBODIMENTS

In the known methods described above, when the addressing voltage is raised, a driver is required to have a high-withstand-voltage and a mechanism for heat dissipation, and hence the cost of the PDP is increased. Furthermore, when the address pulse width is expanded, a period of time for display discharging is restricted and the brightness and the number of the gray-scale levels are reduced. In order to improve these problems, the addressing electrodes are divided into two groups which are an upper group and a lower group, and the number of address drivers is multiplied. However, the cost of the PDP is increased.

The inventors have recognized that the address period of time can be reduced, if surface discharge, which is triggered by the vertical opposite discharge between the addressing electrodes A's and the scanning electrodes Y's, is adapted not to occur between the sustaining electrodes X's and the scanning electrodes Y's during an address period in driving a PDP.

An object of the present invention is to prevent the surface discharge from occurring between the sustaining electrodes and the scanning electrodes during an address period in driving a PDP.

Another object of the present invention is to reduce the width of address pulses in the addressing discharge in driving the PDP and to provide a shorter address period.

A further object of the invention is to provide a longer display period of time in driving a PDP.

A still further object of the invention is to provide a higher quality of displaying in a PDP.

According to the invention, an address period in driving the PDP can be made shorter, and thereby a display period can be made longer, to provide a higher quality of display.

The invention will be described with reference to the accompanying drawings. Throughout the drawings, similar symbols and numerals indicate similar items and functions.

Figure 1:
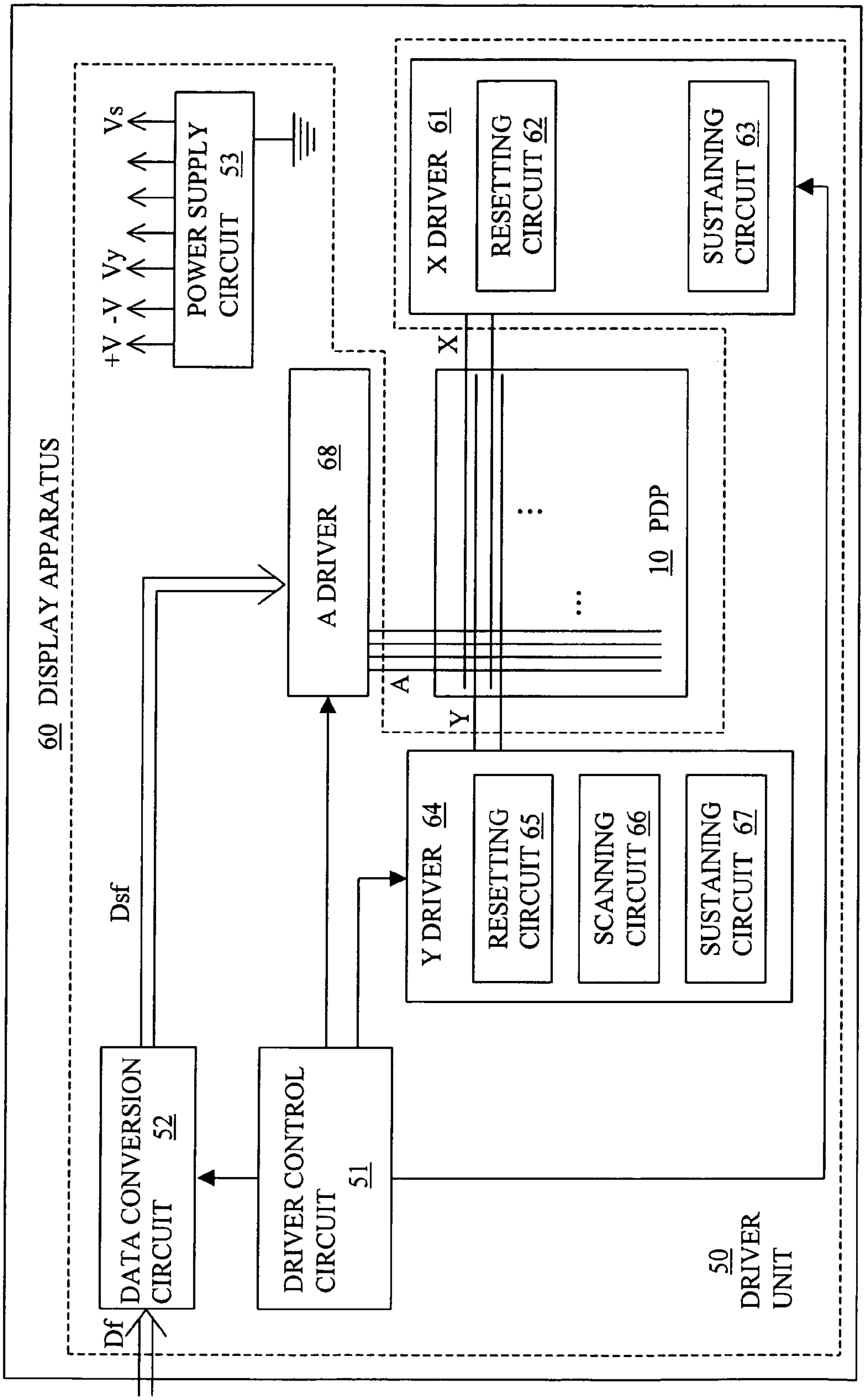
FIG. 1 shows a schematic arrangement of a display apparatus for use in an embodiment of the present invention.

FIG. 1 shows a schematic arrangement of a display apparatus 60 for use in an embodiment of the present invention. The display apparatus 60 includes a plasma display panel (PDP) 10 of the three-electrode surface discharge structure type having a display screen with an array of m×n cells arranged, and a driver unit 50 for selectively controlling the cells to emit light. The display apparatus 60 is applicable to, for example, a television receiver, a monitor display of a computer system, and the like.

In the PDP 10, pairs of displaying electrodes X and Y, which generate discharges for displaying, are arranged in parallel to each other, and addressing electrodes A's are arranged such that the addressing electrodes A's cross the displaying electrodes X's and Y's. The displaying electrodes X's are sustaining electrodes, and the displaying electrodes Y's are scanning electrodes. The displaying electrodes X's and Y's typically extend in the row or horizontal direction of the display screen, and the addressing electrodes A's extend in the column or vertical direction.

The driver unit 50 includes a driver control circuit 51, a data conversion circuit 52, a power supply circuit 53, an X electrode driver circuit or X driver circuit 61, a Y electrode driver circuit or Y driver circuit 64, and an addressing electrode driver circuit or A driver circuit 68. The driver unit 50 is implemented in the form of an integrated circuit, which may possibly contain an ROM. A field of data Df representative of the magnitudes of light emission for the three primary colors of R, G and B is provided together with various synchronized signals to the driver unit 50 from an external device, such as a TV tuner or a computer. The field data Df is temporarily stored in a field memory of the data conversion circuit 52. The data conversion circuit 52 converts the field data Df into subfields of data Dsf for displaying in gradation, and provides the subfield data Dsf to the A driver circuit 68. The subfield data Dsf is a set of display data associating one bit with each cell, and the value for each bit represents whether or not each cell should emit light during the corresponding one subfield SF, or more particularly whether or not each cell should produce discharge for addressing.

The X driver circuit 61 includes a resetting circuit 62 for applying a voltage for initialization to the displaying electrodes X's to equalize the wall voltages in a plurality of cells forming the display screen of the PDP 10, and a sustaining circuit 63 for applying sustain pulses to the displaying electrodes X's to cause the cells to produce discharge for displaying. The Y driver circuit 64 includes a resetting circuit 65 for applying a voltage for initialization to the displaying electrodes Y's, a scanning circuit 66 for applying scan pulses to the displaying electrodes Y's for addressing, and a sustaining circuit 67 for applying sustain pulses to the displaying electrodes Y's to cause the cells to produce discharge for displaying. The A driver circuit 68 applies address pulses to the addressing electrodes A's designated in the subfield data Dsf in accordance with the displaying data.

The driver control circuit 51 controls the application of the pulses, and the transfer of the subfield data Dsf. The power supply circuit 53 supplies driving power to desired portions of the unit.

Figure 2:
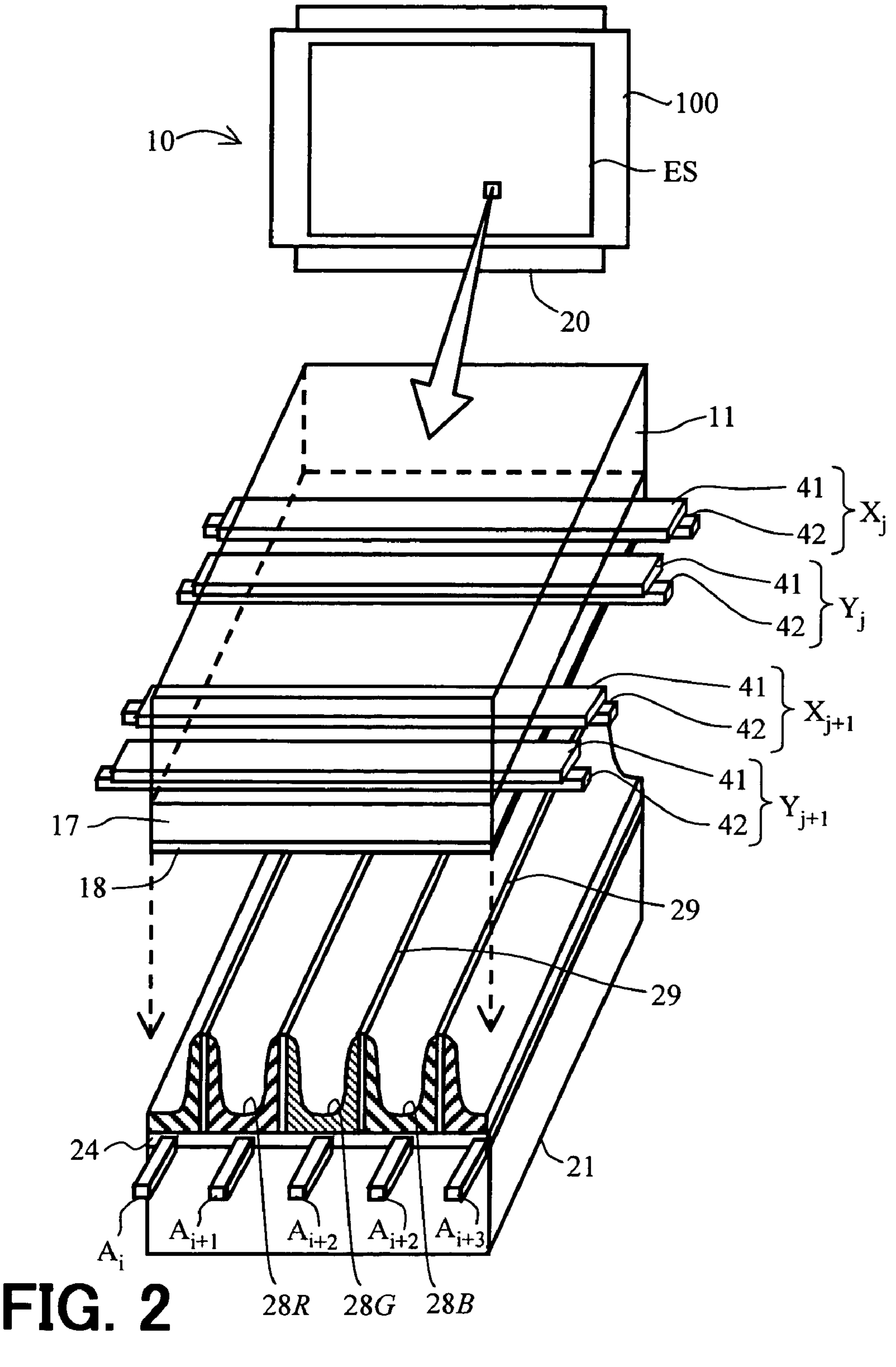
FIG. 2 shows an example of the cell structure of the PDP.

FIG. 2 shows an example of the cell structure of the PDP 10. The PDP 10 includes a pair of substrate structures (which have cell elements disposed on glass substrates) 100 and 20. On the inner surface of a front glass substrate 11, pairs of displaying electrodes X and Y are arranged in the respective rows of a display screen ES which has n rows and m columns. In the figure, the subscript j to the displaying electrodes X and Y indicates the position of an arbitrary row and the subscript i to the addressing electrode A indicates the position of an arbitrary column. The displaying electrodes X's, and Y's are formed by transparent conductive films 41 forming a gap for surface discharge, and metal films 42 overlaid on the edge portions of the transparent conductive films 41, and are covered with a dielectric layer 17 and a protection layer 18. On the inner surface of a rear glass substrate 21, addressing electrodes A's are arranged in the respective rows, and these addressing electrodes A's are covered with a dielectric layer 24. Ribs or separating walls 29 partitioning the discharge spaces for the respective columns are provided on the dielectric layer 24. The ribs are arranged in a pattern of stripes. A layer of phosphors 28R, 28G, 28B for color display, which covers the front surface of the dielectric layer 24 and the inner side surfaces of the ribs 29, is locally excited by a UV ray radiated by a discharge gas of the cell, and emits visible light. The italics R, G and B in the figure indicate the colors of the emitted lights of the phosphors. The arrangement of the colors has a repeated pattern of R, G and B, in which the cells in each column exhibit the same color.

One picture typically has one frame period of approximately 16.7 ms. One frame consists of two fields in the interlaced scanning scheme, and one frame consists of one field in the progressive scanning scheme. In displaying on the PDP 10, for reproducing colors by the binary control of light emission, one field F in the time series, representative of an input image of one such field period, is typically divided into a predetermined number, q, of subfields SF's. Typically, each field F is replaced with a set of q subfields SF's. Often, the number of times of discharging for display for each subfield SF is set by weighting these subfields SF's with respective weighting factors of $2^0$, $2^1$, $2^2$, . . . , $2^{q-1}$ in this order. However, the weighting factors to be associated with the subfields SF's are not limited to the powers of two, as described above. N ($=1+2^1+2^2+\ldots+2^{q-1}$) steps of brightness can be provided for each color of R, G and B in one field by associating light emission or non-emission with each of the subfields in combination. In accordance with such a field structure, a field period Tf, which represents a cycle of transferring field data, is divided into q subfield periods Tsf's, and the subfield periods Tsf's are associated with respective subfields SF's of data. Furthermore, a subfield period Tsf is divided into a reset period TR for initialization, an address period TA for addressing, and a display or sustain period TS for emitting light. Typically, the lengths of the reset period TR and the address period TA are constant independently of the weighting factors for the brightness, while the number of pulses in the display period becomes larger as the weighting factor becomes larger, and the length of the display period TS becomes longer as the weighting factor becomes larger. In this case, the length of the subfield period Tsf becomes longer, as the weighting factor of the corresponding subfield SF becomes larger. However, the lengths of the reset period TR and the address period TA are not limited to those described above, and these lengths may be different for each subfield.

Figure 3:
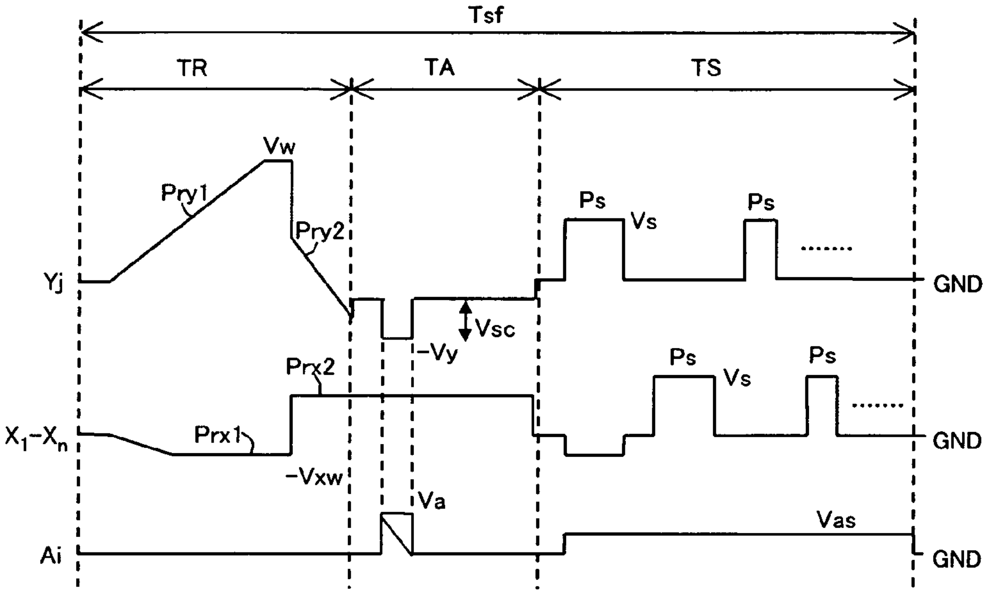
FIG. 3 shows a schematic conventional sequence of output driving voltage waveforms of an X driver circuit, a Y driver circuit and an A driver circuit.

FIG. 3 shows a schematic conventional sequence of output driving voltage waveforms of the X driver circuit 61, the Y driver circuit 64 and the A driver circuit 68. The waveform shown is an example, and the amplitudes, polarities and timings of the waveforms may be varied differently.

q subfields SF's have the same order of a reset period TR, an address period TA and a sustain period TS in the driving sequence, and this sequence is repeated for each subfield SF. During a reset period TR of each subfield SF, a negative polarity pulse Prx1 and a positive polarity pulse Prx2 are applied in this order to all of the displaying electrodes X's, and a positive polarity pulse Pry1 and a negative polarity pulse Pry2 are applied in this order to all of the displaying electrodes Y's. Each of the pulses Prx1, Pry1 and Pry2 has a ramping waveform having the amplitude which gradually increases at the rate of variation that produces micro-discharge. The first pulses Prx1 and Pry1 are applied to produce, in all of the cells, appropriate wall voltages having the same polarity, regardless of whether the cells have been illuminated or unilluminated during the previous subfield. By applying the second pulses Prx2 and Pry2 to the cells having the appropriate wall charges, the wall voltages can be adjusted to have values which correspond to the differences between the respective discharge starting voltages and the pulse amplitude voltage. The pulses may be applied to only one of the groups of displaying electrodes X's and of the displaying electrodes Y's for initialization. However, the driver circuit elements are allowed to have lower withstand voltages by applying the pair of pulses having the respective opposite polarities, to the respective displaying electrodes X's and Y's as shown. The driving voltage applied to the cell is a combined voltage which is a sum of the amplitudes of the pulses applied to the respective displaying electrodes X and Y.

During the address period TA, wall charges required for sustaining illumination are produced only on the cells to be illuminated. While all of the displaying electrodes X's and of the displaying electrodes Y's are biased at the respective predetermined potentials, a negative scan pulse voltage −Vy is applied to a row of a displaying electrode Y corresponding to a selected row for each row selection interval (a scanning interval for one row of the cells). Simultaneously with this row selection, an address pulse voltage Va is applied only to addressing electrodes A's which correspond to the selected cells to produce addressing discharges. Thus, the potentials of the addressing electrodes $A_1$ to $A_m$ are binary-controlled in accordance with the subfield data Dsf for m columns in the selected row j. The selected cells produce discharges between their displaying electrodes Y's and addressing electrodes A's. The addressing discharges trigger or activate subsequent surface discharges between the displaying electrodes X's and Y's. A series of these discharges form the addressing discharges.

During the sustain period TS, a first sustain pulse Ps having a predetermined polarity (the positive polarity in the example shown in the figure) is applied to all of the displaying electrodes Y's. Then, the sustain pulse Ps is applied alternately to the displaying electrodes X's and the displaying electrodes Y's. The amplitude of the sustain pulse Ps corresponds to the sustaining voltage Vs. The application of the sustain pulse Ps produces surface discharge in the cells which have a predetermined amount of residual wall charge. The number of applied sustain pulses Ps corresponds to the weighting factor of the subfield SF as described above. In order to prevent undesired vertical opposite discharge between the opposite A and X/Y electrodes during the entire sustain period TS, the addressing electrodes A's are biased at a voltage Vas having the same polarity as the sustain pulse Ps.

FIGS. 4A, 4B and 4C show different states of the wall charges induced over the addressing electrode $A_i$, the sustaining electrode $X_j$ and the scanning electrode $Y_j$ of a cell, that appear right after the reset discharge, during the subsequent addressing discharge, and right after the addressing discharge, respectively, in accordance with the conventional driving sequence shown in FIG. 3.

During a reset period TR, the applied voltage waveforms and potentials are controlled so that only the scanning electrode $Y_j$ is assumed to be an anode and the addressing electrode $A_i$ and the sustaining electrode $X_j$ are assumed to be cathodes. Consequently, as shown in FIG. 4A, before the addressing discharge right after the reset discharge, a negative polarity charge is induced on the $Y_j$ electrode, and positive polarity charges are induced on the addressing electrode $A_i$ and the sustaining electrode $X_i$. As shown in FIG. 4B, during the addressing discharge, surface discharge is produced between the sustaining electrode $X_j$ and the scanning electrode $Y_j$, which is triggered by the vertical opposite discharge between the addressing electrode $A_i$ and the scanning electrode $Y_j$. As shown in FIG. 4C, right after the addressing discharge, a negative charge is induced on the sustaining electrode $X_j$, and a positive charge is induced on the scanning electrode $Y_j$, to thereby allow subsequent sustaining discharge.

However, the addressing discharge involves the three electrodes, and hence, even when the vertical opposite discharge is produced between the addressing electrode $A_i$ and the scanning electrode $Y_j$, the addressing discharge may result in failure if the surface discharge is not produced between the scanning electrode $Y_j$ and the sustaining electrode $X_j$. This requires the width of the address pulse to be larger than a predetermined value. If the period of time for addressing is longer, then the period of time for the displaying discharge becomes shorter, and hence the brightness and the number of gray-scale levels are reduced.

A PDP driver unit 50 in accordance with the embodiment of the present invention provides distinctive polarities of the pulse or ramping voltages applied to the scanning electrodes Y's and the sustaining electrodes X's during the reset period TR. This reduces the address period TA, and thereby the sustain period TS can be made longer, to provide a higher quality of display.

Figures 5A, 5B, 5C:
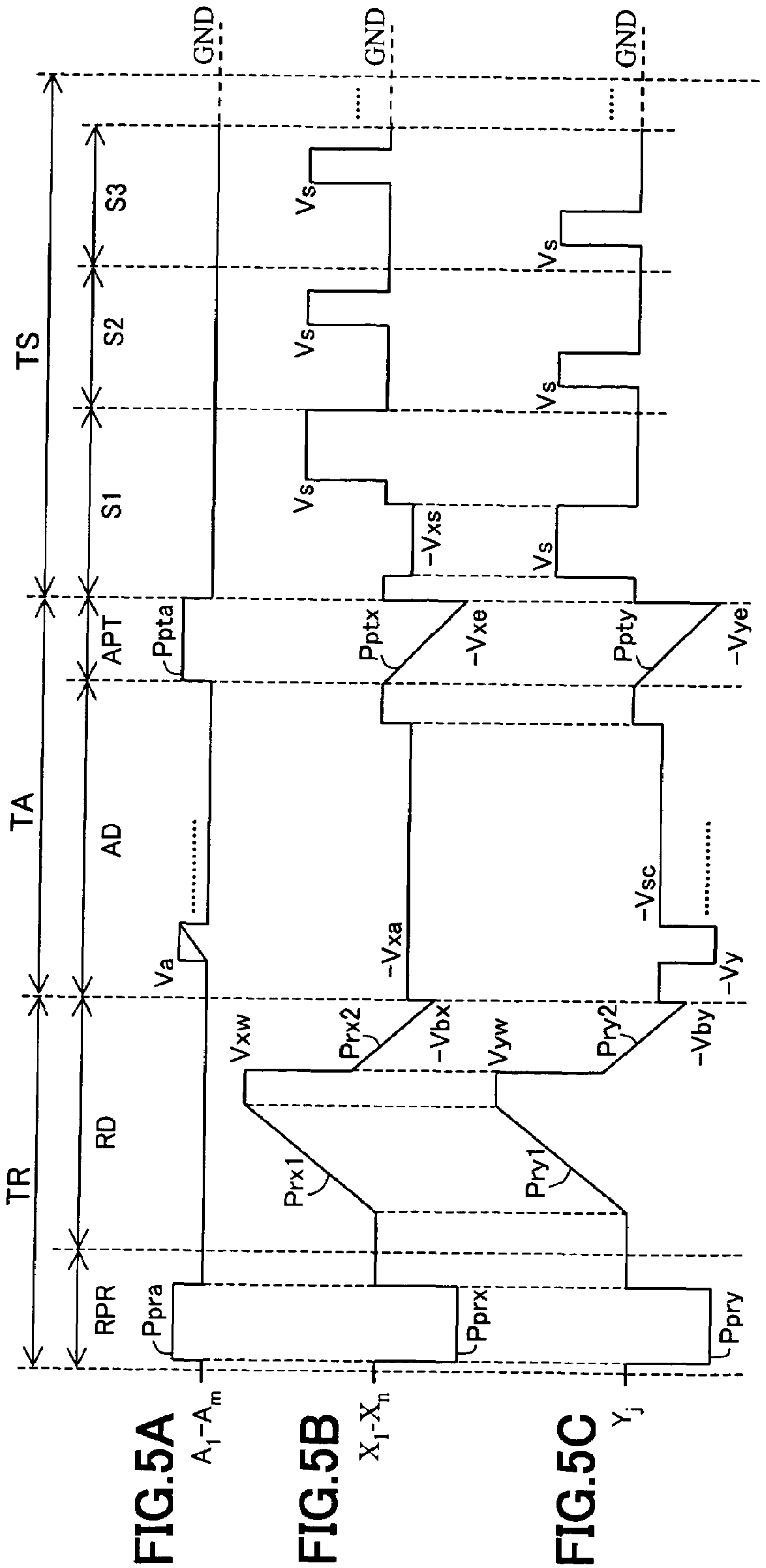
FIGS. 5A, 5B and 5C show a schematic driving sequence of output driving voltage waveforms of the A driver circuit, the X driver circuit and the Y driver circuit, in accordance with the embodiment of the present invention.

FIGS. 5A, 5B and 5C show a schematic driving sequence of output driving voltage waveforms of an A driver circuit 68, an X driver circuit 61 and a Y driver circuit 64, in accordance with the embodiment of the present invention. The waveforms shown in the figures are examples, and the waveforms, amplitudes, polarities and timings may be varied differently. The q subfields have the same order of a reset period TR, a address period TA and a sustain period TS in the driving sequence, and this sequence is repeated for each subfield SF.

In accordance with the embodiment of the invention, the reset period TR of each subfield SF contains a pre-resetting or pre-process interval RPR and a resetting discharge interval RD. The address period TA contains an addressing discharge interval AD and a post-addressing or post-process interval APT.

Figure 6A:
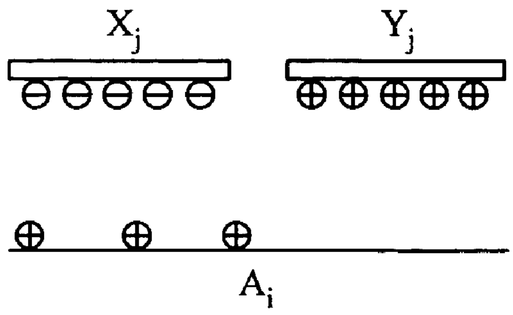
FIGS. 6A, 6B and 6C show different states of charges induced over the addressing electrode, the sustaining electrode and the scanning electrode of a previously illuminated cell, that appear right after a sustain period TS in the previous subfield, during the pre-resetting interval of the subsequent reset period, and right after the resetting discharge interval, respectively.
Figure 6B:
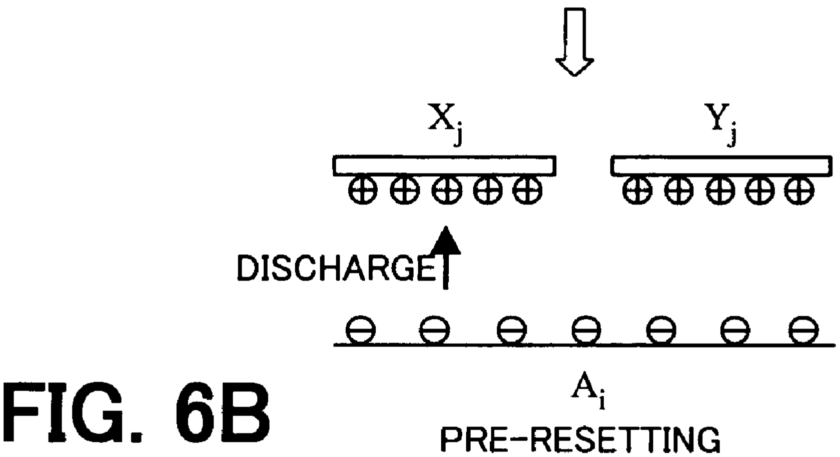
Figure 6C:
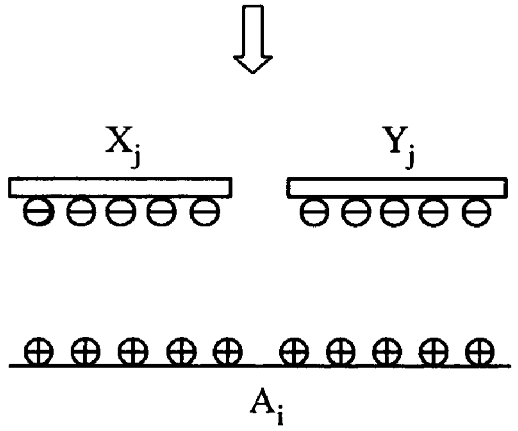

FIGS. 6A, 6B and 6C show different states of charges induced over the addressing electrode $A_i$, the sustaining electrode $X_j$ and the scanning electrode $Y_j$ of a previously illuminated cell, that appear right after a sustain period TS in the previous subfield SF, during the pre-resetting interval RPR of the subsequent reset period TR, and right after the reset discharge interval RD, respectively.

Figures 7A, 7B, 7C:
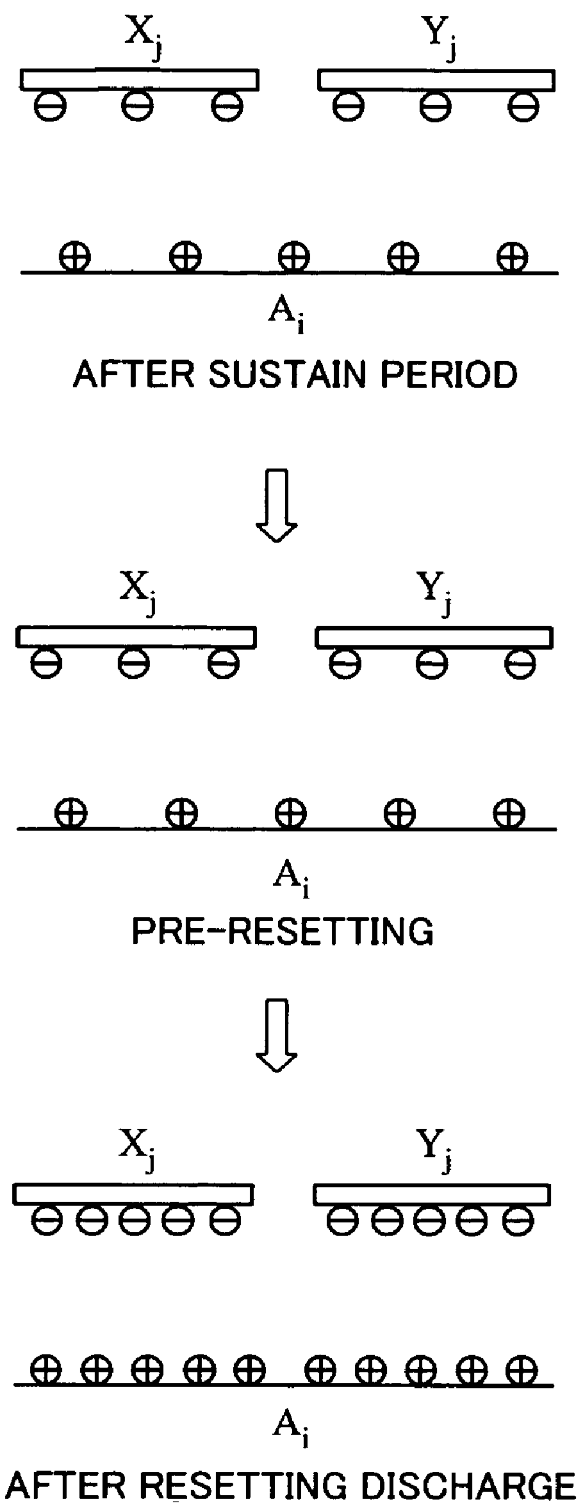
FIGS. 7A, 7B and 7C show different states of charges induced over the addressing electrode, the sustaining electrode and the scanning electrode in a previously unilluminated cell, that appear right after the sustain period in the previous subfield, during the pre-resetting interval of the subsequent reset period, and right after the resetting discharge interval, respectively.

FIGS. 7A, 7B and 7C show different states of charges induced over the addressing electrode $A_i$, the sustaining electrode $X_j$ and the scanning electrode $Y_j$ in a previously unilluminated cell, that appear right after the sustain period TS in the previous subfield SF, during the pre-resetting interval RPR of the subsequent reset period TR, and right after the reset discharge interval RD, respectively.

In FIG. 6A, a positive charge, a negative charge and a positive charge are induced on the addressing electrode $A_i$, the sustaining electrode $X_j$ and the scanning electrode $Y_j$, respectively, in the previously illuminated cell right after the sustain period TS. In FIG. 7A, a positive charge, a negative charge and a negative charge are induced on the addressing electrode $A_i$, sustaining electrode $X_j$ and the scanning electrode $Y_j$, respectively, in a previously unilluminated cell, right after the sustain period TS. However, the wall charge has already disappeared due to eliminating discharge in the previous address period TA as described later.

As shown in FIGS. 5A to 5C, during the pre-resetting interval RPR, the A driver circuit 68 applies a positive polarity pulse voltage Ppra to all of the addressing electrodes A1 to Am, and the resetting circuit 62 of the X driver circuit 61 and a resetting circuit 65 of the Y-driver circuit 64 apply negative polarity pulse voltages Pprx and Ppry to all of the sustaining electrodes X1 to Xn and all of the scanning electrodes Y1 to Yn, respectively. This causes the cell illuminated during the previous sustain period TS to produce discharge between the electrode $A_i$ and the electrode $X_j$, as shown in FIG. 6B, to thereby reverse the polarity of the charge on the electrode $X_j$. This causes the charge on the electrode $X_j$ to have the same polarity, i.e. positive polarity, as the charge on the electrode $Y_j$ has, and the amounts of these charges become substantially equal to each other. On the other hand, as shown in FIG. 7B, right after the pre-resetting interval RPR, the wall charge has disappeared on the addressing electrode $A_i$ and the sustaining electrode $X_j$, and the scanning electrode $Y_j$ in a previously unilluminated cell, and hence no discharge occurs therebetween, so that the states of charges remain the same as the states shown in FIG. 7A. These states of the charges on the electrodes of the cell facilitate the writing discharge between the electrode $X_j$ and the electrode $A_i$, and between the electrode $Y_j$ and the electrode $A_i$ during the subsequent resetting discharge interval RD.

During the resetting discharge interval RD, the resetting circuits 62 and 65 apply a positive polarity up-ramping pulse voltage Prx1 having the peak value Vxw and a subsequent negative polarity down-ramping pulse voltage Prx2 having the peak value −Vbx to all of the sustaining electrodes X's, and apply a positive polarity up-ramping pulse voltage Pry1 having the peak value Vyw and a subsequent negative polarity down-ramping pulse voltage Pry2 having the peak value −Vby to all of the scanning electrodes Y's. This causes discharge to produce between the scanning electrodes Y's and the addressing electrodes A's, and discharge to produce between the sustaining electrodes X's and the addressing electrodes A's, while the addressing electrodes A's are used as cathodes. Each of the ramping pulse voltages Prx1, Prx2, Pry1 and Pry2 has a ramping pulse waveform having the amplitude which changes at the rate of variation that produces micro-discharge. The first ramping pulse voltages Prx1 and Pry1 are applied so as to develop the wall voltages in all of the cells, regardless of whether or not the cells have been illuminated during the previous subfield SF. During this interval RD, the addressing electrodes A's are kept at a predetermined potential, preferably at the ground potential GND. By applying the subsequent ramping pulse voltages Prx2 and Pry2 in the cells having the appropriate wall charges, the wall voltages can be adjusted to have values which correspond to the differences between the respective discharge starting voltages and the pulse amplitude voltage.

In order to adjust the wall voltage to the value which corresponds to the difference between the discharge starting voltage and the pulse amplitude voltage, the peak potentials Vxw and Vyw of the ramping reset pulses Prx1 and Pry1 are determined so that the following formula is satisfied.

$$|Vxw|>|Vfx-a| \text{ and}$$

$$|Vyw|>|Vfy-a|$$

where the symbol "||" represents an absolute value, and Vfx−a and Vfy−a represent the discharge starting voltage between the sustaining electrode X and the addressing electrode A and the discharge starting voltage between the scanning electrode Y and the addressing electrode A, respectively, assuming the addressing electrode A as a cathode.

Thus, as shown in FIGS. 6C and 7C, a positive charge, a negative charge and a negative charge are induced on the addressing electrode $A_i$, the sustaining electrode $X_j$ and the scanning electrode $Y_j$, respectively, in the cell after the resetting discharge interval RD.

Figure 8A:
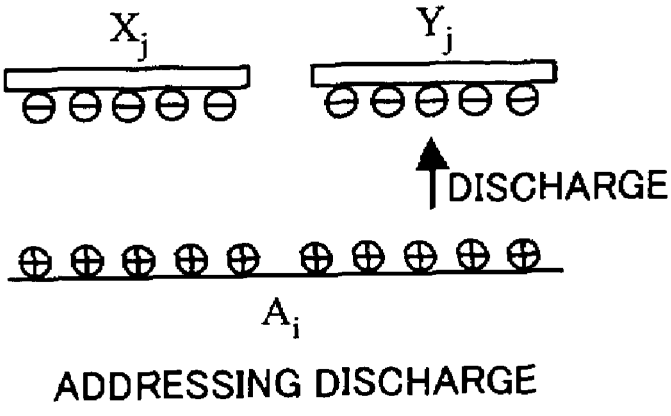
FIGS. 8A, 8B and 8C show different states of charges induced over the addressing electrode, the sustaining electrode and the scanning electrode in a cell to be illuminated, that appear during the addressing discharge interval of the address period, right after the addressing discharge interval, and during the post-addressing interval, respectively.
Figure 8B:
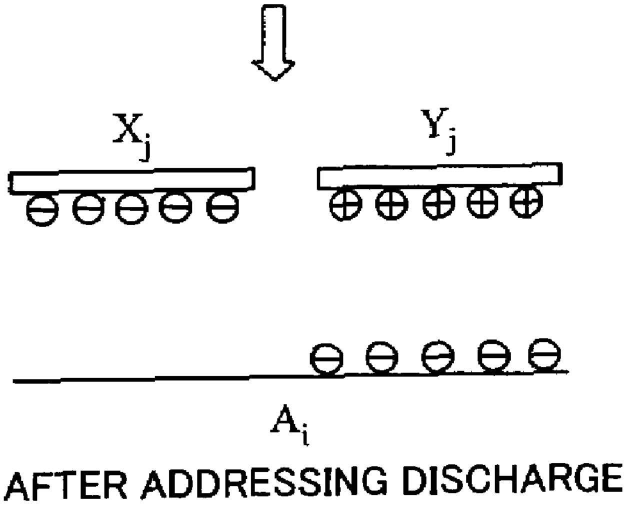
Figure 8C:
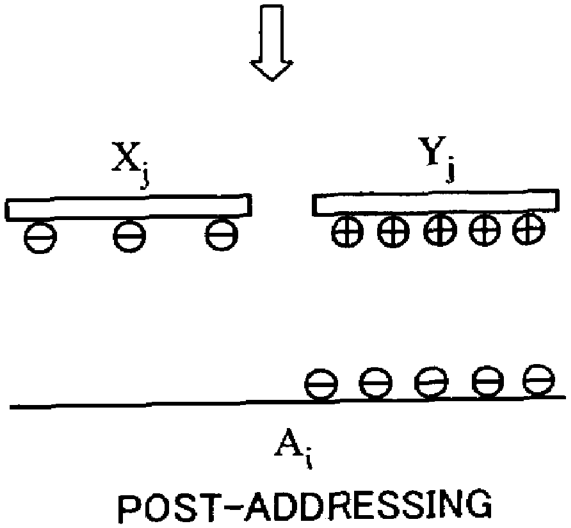

FIGS. 8A, 8B and 8C show different states of charges induced over the addressing electrode $A_i$, the sustaining electrode $X_j$ and the scanning electrode $Y_j$ in the cell to be illuminated, that appear during the addressing discharge interval AD of the address period TA, right after the addressing discharge interval AD, and during the post-addressing interval APT, respectively.

Figure 9A:
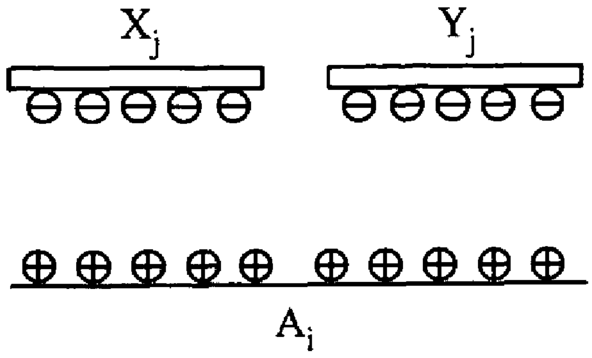
FIGS. 9A, 9B and 9C show different states of charges induced over the addressing electrode, the sustaining electrode and the scanning electrode in a cell to be unilluminated, that appear during the addressing discharge interval of the address period, right after the addressing discharge interval, and during the post-addressing interval, respectively.
Figure 9B:
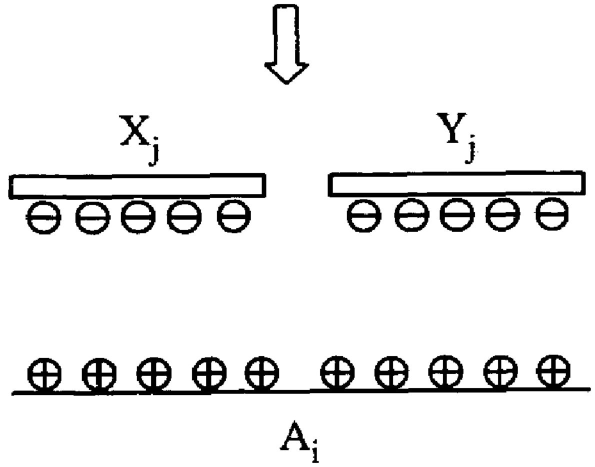
Figure 9C:
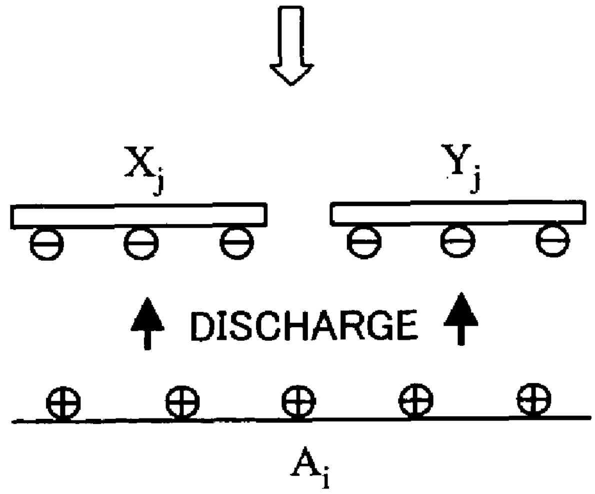

FIGS. 9A, 9B and 9C show different states of charges induced over the addressing electrode $A_i$, the sustaining electrode $X_j$ and the scanning electrode $Y_j$ in the cell to be unilluminated, that appear during the addressing discharge interval AD of the address period TA, right after the addressing discharge interval AD, and during the post-addressing interval APT, respectively.

During the addressing discharge interval AD, the wall charges required for sustaining illumination are produced only in the cells to be illuminated. The scanning circuit 66 applies a negative polarity scanning pulse voltage −Vy to a row of a displaying electrode Y corresponding to a selected row for each row selection interval (a scanning interval for one row of the cells), while all of the sustaining electrodes X's and the other scanning electrodes Y's are biased at respective predetermined potentials. During non row selection intervals for the other rows, however, the X driver circuit 61 and the Y driver circuit 64 may bias the corresponding sustaining electrodes X's and the corresponding scanning electrodes Y's at an equal potential ($|Vxa|=|Vsc|$) or at respective different potentials ($|Vxa|\neq|Vsc|$). The A driver circuit 68 applies positive polarity address pulse voltages Va only to the addressing electrodes $A_i$ in the corresponding selected cells which are required to produce the addressing discharges during the row selection interval. The other addressing electrodes A's are kept at a predetermined potential equal to the potential during the reset period TR, preferably at the ground potential GND. Thus, the potentials of the addressing electrodes A1 to Am are binary-controlled in accordance with the subfield data Dsf for m columns of the selected row j.

In order to facilitate the addressing discharge to occur, the potential −Vby of the ramping pulse Pry2 and the potential −Vy of the scanning pulse are preferably determined so that the following formula is satisfied.

$$|Vby|<|Vy|$$

As shown in FIG. 8A, during the addressing discharge interval AD, the selected cell produces discharge between the scanning electrode $Y_j$ and the addressing electrode $A_i$. As shown in FIG. 8B, after the addressing discharge, a negative charge is induced on the addressing electrode $A_i$, a negative charge remains on the sustaining electrode $X_j$, and a positive charge is induced on the scanning electrode $Y_j$. In this case, no surface discharge occurs between the scanning electrode $X_j$ and the sustaining electrode $Y_j$.

On the other hand, no discharge occurs in the unselected cells. As shown in FIG. 9A, during the addressing discharge interval AD, no discharge occurs between the electrodes in the cells to be unilluminated, and a positive charge, a negative charge and a negative charge remain on the addressing electrode $A_i$, the sustaining electrode $X_j$ and the scanning electrode $Y_j$, respectively, and, as shown in FIG. 9B, the charges on the electrodes in the cell remain even after the addressing discharge interval RD.

During the post-addressing interval APT in the address period TA, discharge for eliminating the charges in the unilluminated cells is produced. In this discharge, the discharge magnitude should be desirably minimized, and hence the X driver circuit 61 and the Y driver circuit 64 preferably apply negative polarity ramping pulse voltages Pptx and Ppty having the peak values −Vxe and −Vye, respectively, to the $X_j$ electrode and the $Y_j$ electrode. The peak values −Vxe and −Vye are preferably equal to the scanning pulse potential −Vy. During this interval APT, the A driver circuit 68 applies a positive polarity pulse voltage Ppta having the height preferably equal to that of the address pulse voltage Va, to the addressing electrode $A_i$. In FIG. 9C, during the post-addressing interval APT, small discharge occurs between the sustaining and scanning electrodes $X_j$ and $Y_j$, and the addressing electrode $A_i$ in the cell to be unilluminated, and the charge on each electrode in FIG. 9B reduces. In FIG. 8C, however, no discharge occurs between the sustaining and scanning electrodes $X_j$ and $Y_j$, and the addressing electrode $A_i$. In the post-addressing interval APT, however, the negative charge reduces somewhat on the sustaining electrode $X_j$ in the selected cell after the addressing discharge.

During the interval of a first sustain pulse S1 in the sustain period TS, the sustaining circuit 67 applies a positive polarity sustaining pulse voltage Vs to all of the scanning electrodes Y's for somewhat longer duration, and the sustaining circuit 63 applies a negative polarity voltage −Vxs that is somewhat larger than the conventional voltage to all of the sustaining electrodes X's for a somewhat longer duration, to thereby compensate the wall voltage reduction for the somewhat reduced wall charge on the electrodes $X_j$ in the selected cells during the post-addressing interval APT. Then the positive polarity sustaining pulse voltage Vs is applied to all of the sustaining electrodes X's for a somewhat longer duration. During the subsequent intervals of sustain pulses S2, S3, . . . , the sustaining circuit 67 and the sustaining circuit 63 apply the sustaining pulse voltage Vs having a narrower width alternately to the displaying electrodes X's and the displaying electrodes Y's. The alternate application of the sustaining pulse voltage Vs causes the surface discharges to occur between the sustaining electrodes $X_j$ and the scanning electrodes $Y_j$ in the selected cells, where a predetermined amount of the wall charge remains. The number of times of applying the sustaining pulse voltage Vs corresponds to the weighting factor of the subfield SF as described above. During the entire sustain period TS, the addressing electrodes A's are kept at a potential equal to that of the reset period as described above, preferably at the ground potential. The states of the charges on the addressing electrode $A_i$, the sustaining electrode $X_j$ and the scanning electrode $Y_j$ in the illuminated and unilluminated cells after the sustain period TS are shown in FIGS. 6A and 7A, respectively, as described above.

Referring back to FIGS. 6A and 6B, during the pre-resetting interval RPR in the reset period TR of the subsequent subfield SF, as described above, a pulse voltage having the height preferably equal to that of the address pulse potential is applied to all of the addressing electrodes A's, and a pulse voltage having the potential preferably equal to that of the scanning pulse voltage is applied to all of the scanning electrodes Y's and of the sustaining electrodes X's. Thus, discharge occurs between the addressing electrodes $A_i$ and the sustaining electrodes $X_j$ only in the cells illuminated during the sustain period TS in the previous field SF, and the polarity of the charges on the sustaining electrodes $X_j$ is reversed. Thus the charges on the sustaining electrodes $X_j$ have the same polarity, i.e. positive polarity, as that on the scanning electrodes $Y_j$. Thus the operation facilitates writing discharges between the scanning electrodes $Y_j$ and the addressing electrodes $A_i$ and between the sustaining electrodes $X_j$ and the addressing electrodes $A_i$ during the subsequent resetting discharge interval RD. On the other hand, referring back to FIGS. 7A and 7B, the unselected cells produce no discharge, because they have lost the wall charges due to the elimination discharge in the unselected cell during the post-addressing interval APT in the previous address period TA.

According to the embodiment of the present invention, the wall charges having the same polarity are produced by applying the positive ramping voltage to the scanning electrodes Y's and the sustaining electrodes X's, and hence no surface discharge is required to occur between the scanning electrode $X_j$ and the sustaining electrode $Y_j$ in the addressing discharge in the address period. Thus the address period in driving the PDP can be made shorter. Thus the display period can be made longer, to thereby provide a higher quality of display in the PDP.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. A method of driving a plasma display panel comprising plural cells, each cell having parallel first and second electrodes covered with a dielectric layer and a third electrode disposed in a direction crossing the first and second electrodes, wherein a period for driving the plasma display panel is divided into a reset period for equalizing wall voltages in the cells, an address period for designating each cell, to be illuminated, in accordance with display data of the plural cells and a sustain period for illuminating the designated cells, to be illuminated, the method comprising:

effecting, during the reset period, a first voltage applying operation in which a first rectangular waveform voltage, having one of a positive or a negative polarity, is applied to the respective first and second electrodes of the plural cells so as to produce a discharge solely between the first and third electrodes of each cell that was illuminated in a sustain period immediately before the reset period, and a second rectangular waveform voltage, having an opposite polarity to that of the first rectangular waveform voltage, is applied to the third electrode of the cells, the first rectangular waveform voltage and the second rectangular waveform voltage being applied at a substantially common time and subsequently, effecting during the reset period, a second voltage applying operation in which ramping waveform voltages having the same polarity are applied to both the first and second electrodes of the cells at the same time so as to produce a discharge between the first and third electrodes of the cells and between the second and third electrodes of the cells, thereby to produce a discharge, during the address period, solely between the second and third electrodes of the cell to be illuminated, of the plural cells.

2. The method of driving a plasma display panel according to claim 1, wherein each of the ramping waveform voltages applied in the second voltage applying operation comprises a first pulse that changes in a positive direction and a second pulse that changes in a negative direction.

3. The method of driving a plasma display panel according to claim 1, further comprising:

effecting, during the address period, a third voltage applying operation in which ramping waveform pulses are applied to the first and second electrodes of the cells at one time after addressing the cell to be illuminated.

4. The method of driving a plasma display panel according to claim 3, further comprising:

effecting, before the sustain period following the third voltage applying operation, a fourth voltage applying operation in which a pulse, having a peak value equal to that of a sustain pulse and having a larger pulse width than that of the sustain pulse, is applied to the first and second electrodes of the cells, thereby producing discharges in the cells designated to be illuminated.

* * * * *